(12) United States Patent
Nakano et al.

(10) Patent No.: US 8,094,884 B2
(45) Date of Patent: Jan. 10, 2012

(54) APPARATUS AND METHOD FOR DETECTING OBJECT (75) Inventors: Tsuyoshi Nakano, Kanagawa-ken (JP); Susumu Kubota, Tokyo (JP); Yasukazu Okamoto, Hyogo-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 486 days.

(21) Appl. No.: 12/390,745

(22) Filed: Feb. 23, 2009

(65) Prior Publication Data

US 2009/0214081 A1 Aug. 27, 2009

(30) Foreign Application Priority Data

Feb. 25, 2008 (JP) ................................ 2008-043109

(51) Int. Cl.
*G06K 9/00* (2006.01)
*H04N 5/225* (2006.01)
(52) U.S. Cl. ........................ 382/103; 348/169
(58) Field of Classification Search .................. 382/103, 382/236, 287; 348/94, 125, 152, 154, 155, 348/169, 170, 171, 172, 208.1, 208.14, 347, 348/352, 356
See application file for complete search history.

(56) References Cited

U.S. PATENT DOCUMENTS

| 7,512,262 | B2 * | 3/2009 | Criminisi et al. ............. 382/154 |
| 7,599,548 | B2 * | 10/2009 | Nishiyama .................... 382/154 |
| 2006/0013438 | A1 | 1/2006 | Kubota |
| 2007/0211917 | A1 | 9/2007 | Nakano et al. |
| 2008/0285798 | A1 | 11/2008 | Kubota |

FOREIGN PATENT DOCUMENTS

| JP | 2002-24986 | 1/2002 |
| JP | 2006-53890 | 2/2006 |

* cited by examiner

*Primary Examiner* — Abolfzal Tabatabai
(74) *Attorney, Agent, or Firm* — Oblon, Spivak, McClelland, Maier & Neustadt, L.L.P.

(57) ABSTRACT

A disparity profile indicating a relation between a perpendicular position on time series images and a disparity on a target monitoring area based on an arrangement of a camera is calculated. Processing areas are set, by setting a height of each of the processing areas using a length at the bottom of the image obtained by converting a reference value of a height of an object according to the profile, while setting a position of each bottom of processing areas on the image. An object having a height higher than a certain height with respect to the monitoring area, unify an object detection result in each processing area according to the disparity of the object, and detect the object of the whole monitoring area from each processing area is detected. Position and speed for the object detected by the object primary detection unit are estimated.

5 Claims, 11 Drawing Sheets

·······:BOUNDARY LINE

APPARATUS AND METHOD FOR DETECTING OBJECT

CROSS REFERENCE TO RELATED APPLICATION

This application is based upon and claims the benefit of priority from the Japanese Patent Application No. 2008-043109, filed on Feb. 25, 2008, the entire contents of which are incorporated herein by reference.

FIELD OF THE INVENTION

The invention relates to an apparatus which detects objects, such as pedestrians and bicycles using images captured from stereo cameras attached to, for example, a pillar on a road, and estimates movement information such as position and speed of the objects, and a method for the same.

DESCRIPTION OF THE BACKGROUND

Stereo vision techniques have been used for detecting obstacles, such as people. In this technique, disparity is calculated by calculating corresponding points using a correlation operation from camera images on either side. Three-dimensional coordinates of the obstacles are calculated from the calculated disparity, and the objects are detected from height information. However, it is not easy to calculate disparity correctly due to an influence of lighting or weather changes.

JP-A 2006-53890 (KOKAI) discloses an apparatus and a method for obstacle detection which apply a plane projection stereo method as a robust technique against lighting or weather changes. According to JP-A 2006-53890 (KOKAI), a projection parameter is calculated beforehand based on camera images on either side such that positions of points on a road surface in one image corresponds to those on a road surface in the other image. The point set on the road surface of one image, which corresponds to the point on the other image, is calculated based on the calculated projection parameter. Transformed image approximated to one image is created using a relation of the corresponding points. The objects which have a size greater than a certain size in perpendicular above direction with respect to a road plane are detected using the corresponding points and the transformed image.

In this technique, cameras on either side are arranged in the similar height as those of the obstacles, and it is assumed that the depression angle is small. According to this technique, only the boundary line between one obstacle and a road surface with respect to the perpendicular direction of a camera image can be detected. In a case where cameras are arranged in a high position with respect to obstacles and a plurality of obstacles need to be detected in the perpendicular direction of the camera image, the function may not be realized.

SUMMARY OF THE INVENTION

The invention allows a calculation of a profile of disparity of a monitoring area plane in an image in perpendicular direction beforehand, based on an arrangement of cameras. Let the horizontal direction of an image be x and let the vertical direction of an image be y. Height H on the real space of a detection object may be set, and y coordinates position yd on the image where an object is detected may be observed. From a disparity profile on a road surface, the disparity in detection position yd may be calculated. Height h in an image may be found with respect to the height H of real space.

Position and height of a processing area may be determined by setting a margin to detection position yd and height h in upper and lower direction. The width of a processing area may be determined by the width of the x direction of the monitoring area preset. This processing area may be set to all the y coordinate values.

Processing areas may be set at certain intervals in y coordinate in order to reduce the computational cost. The boundary line between a monitoring area plane and an object may be detected for a plurality of processing areas using the plane projection stereo method. An area with edge density greater than a certain density between the top of each of the processing area and the boundary line may be set to be an object existence area. The object existence area in each processing area may be unified, and when the area where y coordinate value is substantially the same has the width greater than a certain width in x direction, an object may be detected. The position and the speed of the object may be estimated by tracking the detected object using the texture information of the object area on an image.

In one or more of the embodiments of the invention, position and speed of a plurality of objects which exist in a large monitoring area, when using camera images captured at the high position may be estimated.

One aspect of the invention provides an object detection apparatus which comprises an image capturing unit configured to capture time series images of a target monitoring area using stereo cameras, a disparity profile calculation unit configured to calculate a disparity profile indicating a relation between a vertical position in the time series images and a disparity on a plane of the target monitoring area, based on an arrangement of the stereo cameras, a processing area setting unit configured to set a plurality of processing areas, by setting a position of the bottom of each of the plurality of processing areas on the time series images and setting a height of each of the processing areas using a length obtained by converting a reference value of a height of an object at the bottom of the processing area according to the disparity profile, an object detection unit configured to detect an object having a height higher than a certain height with respect to a plane of the monitoring area from each of the processing areas, unify an object detection result in each of the processing areas according to the disparity of the object, and detect the object of the whole monitoring area, an object movement information estimation unit configured to estimate position and speed for the object detected by the object primary detection unit.

DETAILED DESCRIPTION OF THE INVENTION

Hereafter, an apparatus of one embodiment of the invention will be explained with reference to the drawings. The apparatus uses an image captured by stereo cameras arranged on a pillar in a sidewalk side. This apparatus estimates position and speed of pedestrians, bicycles etc. in a wide range of a sidewalk.

Figure 1:
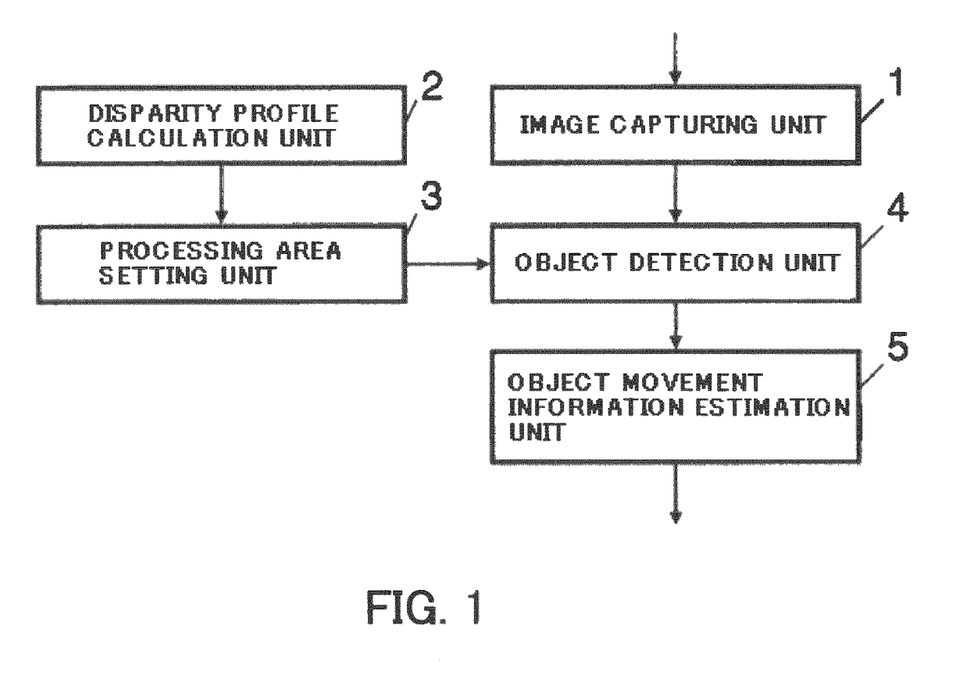
FIG. 1 shows a block diagram of the apparatus of one embodiment of the invention.

FIG. 1 shows an exemplary structure of the apparatus. The object detection apparatus may comprise an image capturing unit 1, a disparity profile calculation unit 2, a processing area setting unit 3, an object detection unit 4 and an object movement information estimation unit 5. Functions of these units 1-5 may be realized by causing a computer to execute a program stored, for example, on a computer readable medium.

Figure 2:
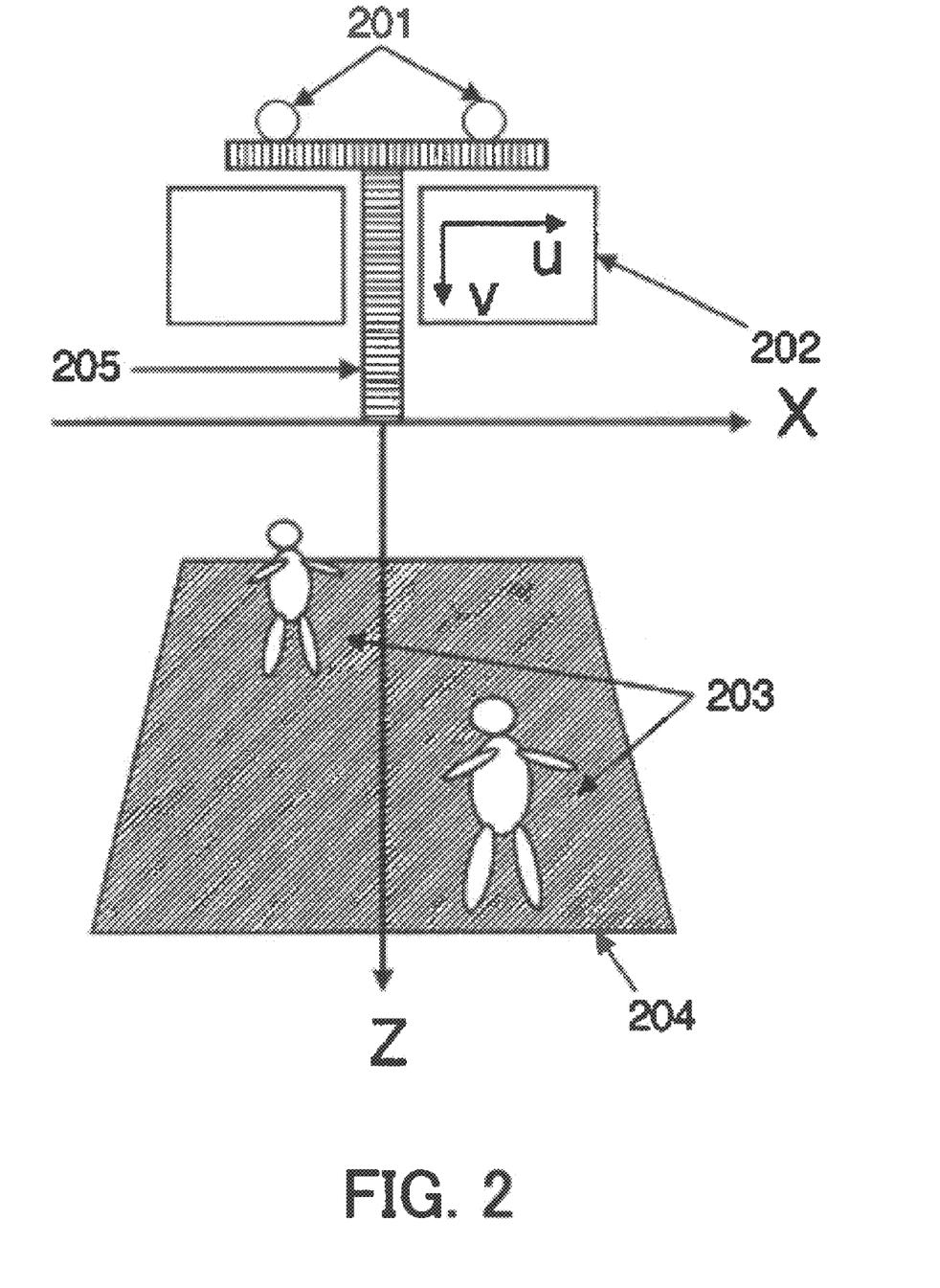
FIG. 2 shows a schematic coordinate system apparatus of one embodiment of the invention.

FIG. 2 shows a schematic coordinate system of the object detection apparatus in this embodiment. In FIG. 2, the horizontal coordinate of real space is expressed with X, and the coordinate of the depth direction is expressed with Z. In FIG. 2, the horizontal coordinate of an image coordinate system is expressed with x, and perpendicular coordinate is expressed with y.

Figure 3A:
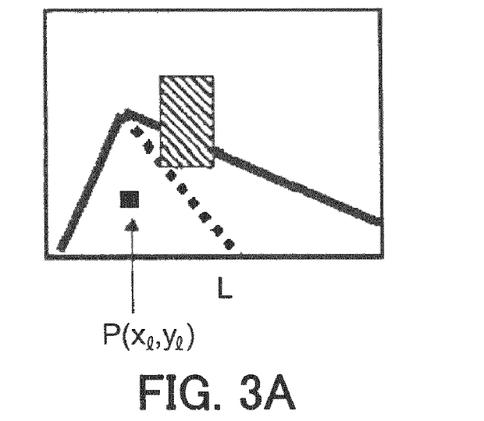
FIG. 3A shows an exemplary left image.
Figure 3B:
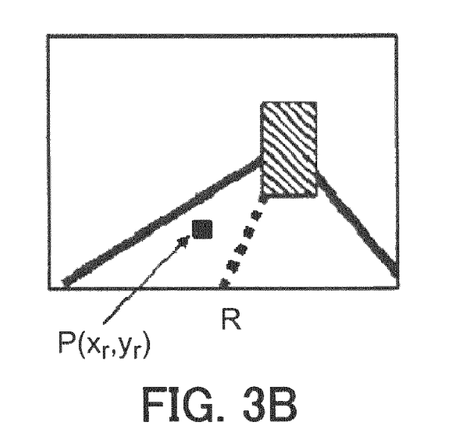
FIG. 3B shows an exemplary right image.
Figure 3C:
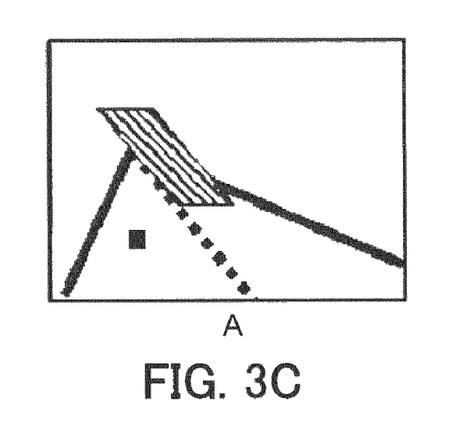
FIG. 3C shows an affine image obtained by performing affine transformation of the right image.

As shown in FIG. 2, stereo cameras 201 arranged on a pillar 205 close to a monitoring area 204 captures time series images. The time series images of the right and left are captured from stereo cameras 201, and rectification may be performed. FIG. 3A shows a left image L captured by the stereo camera 201. FIG. 3B shows a right image R captured by the stereo camera 201. FIG. 3C shows a right affine image A obtained by performing affine transformation for the right image. Let the position of the point on the left image L corresponding to that of the point P on the monitoring area plane be $(x_l, y_l)$ and let the position of the point on the right image R corresponding to that of the point P on the monitoring area plane be $(x_r, y_r)$. These may be approximately related by affine transformation as shown in equation 1.

$$\begin{pmatrix} x_l \\ y_l \end{pmatrix} = \begin{pmatrix} 1 & a \\ 0 & 1 \end{pmatrix} \begin{pmatrix} x_r \\ y_r \end{pmatrix} + \begin{pmatrix} b \\ 0 \end{pmatrix} \quad (1)$$

In other words, the positions of the patterns on the monitoring area plane are the same between the left image L and the right affine image A. The parameters of the affine transformation are calculated beforehand by calibration. From this corresponding relation, disparity d on the monitoring area plane for y coordinates of an image may be calculated, and disparity profile $d_{planar}(y)$ in the y direction on the monitoring area plane may be calculated, as shown in equation 2.

$$d = x_l - x_r = ay + b \quad (2)$$

Figure 4A:
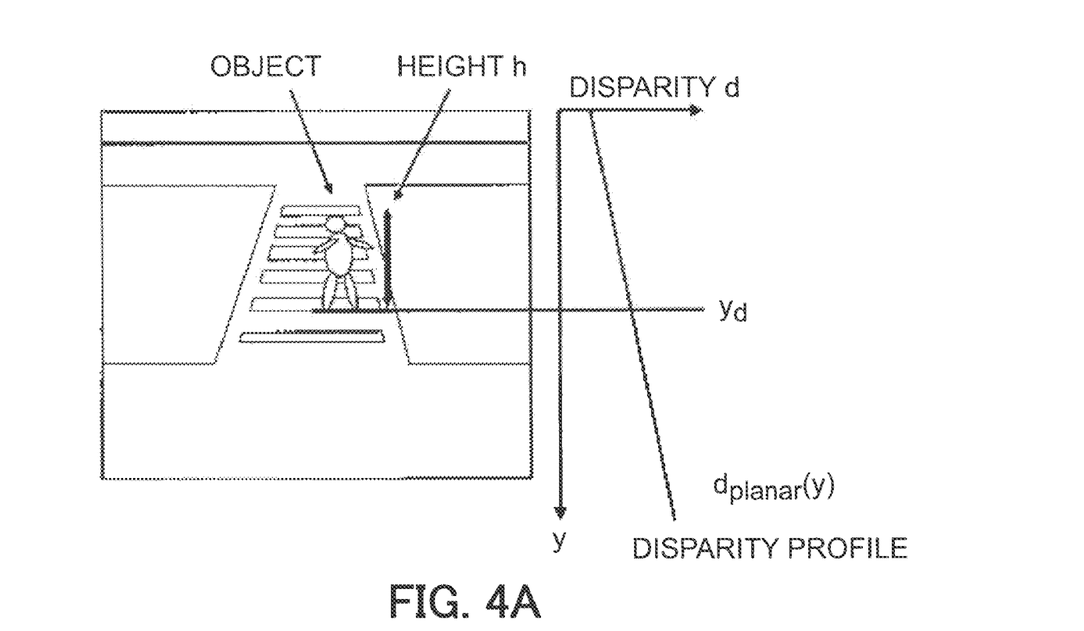
FIG. 4A shows a schematic of setting processing of the processing area of one embodiment of the invention.

The average height of the objects is preset as a reference value H. In this embodiment, the reference value H is set to 1.6 m since the objects are pedestrians and bicycles. A suitable value may be set to the reference value H according to the type of object. As shown in FIG. 4A, y coordinates on the image of the position where an object is detected are set to $y_d$. When objects exist in the position of the y coordinate value yd, disparity d of the objects are calculated using a disparity profile as shown in equation 3.

$$d = d_{planar}(y_d) \quad (3)$$

Figure 4B:
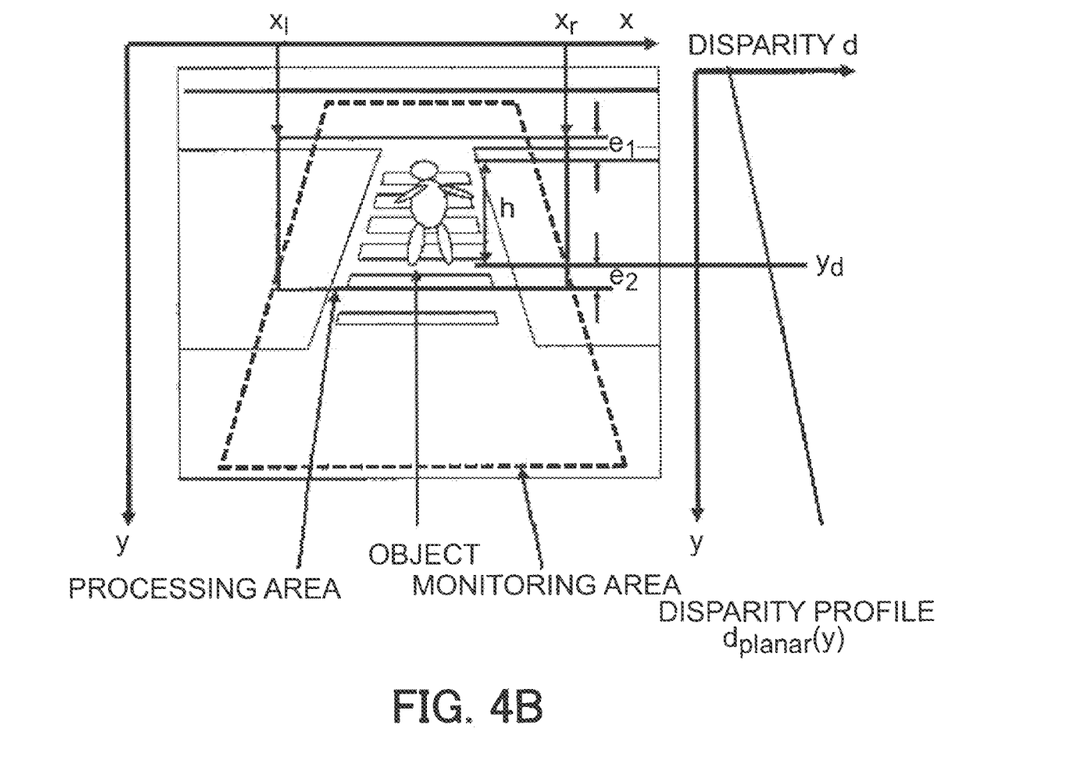
FIG. 4B shows a schematic of setting processing of the processing area of one embodiment of the invention.

Height h in the image corresponding to the height H of the real space in yd is also calculated. As shown in FIG. 4B, the top position is set as $(y_d - h)$, and the bottom position is set as $y_d$. Further, these are extended in upper and lower direction at a unit for the length of $e_1$ in upper direction and $e_2$ in lower direction, which is determined according to disparity d. The top position is determined to be $(y_d - h - e_1)$ and the bottom position is determined to be $(y_d + e_2)$.

The left end position of a processing area is set to be $x_l$ which is x direction position of the monitoring area at bottom position, and the right end position is set to be $x_r$.

A processing area may be determined by the above processing. The processing area of the whole monitoring area may be set by setting a processing area to all the y coordinate values in a similar way.

Figure 5:
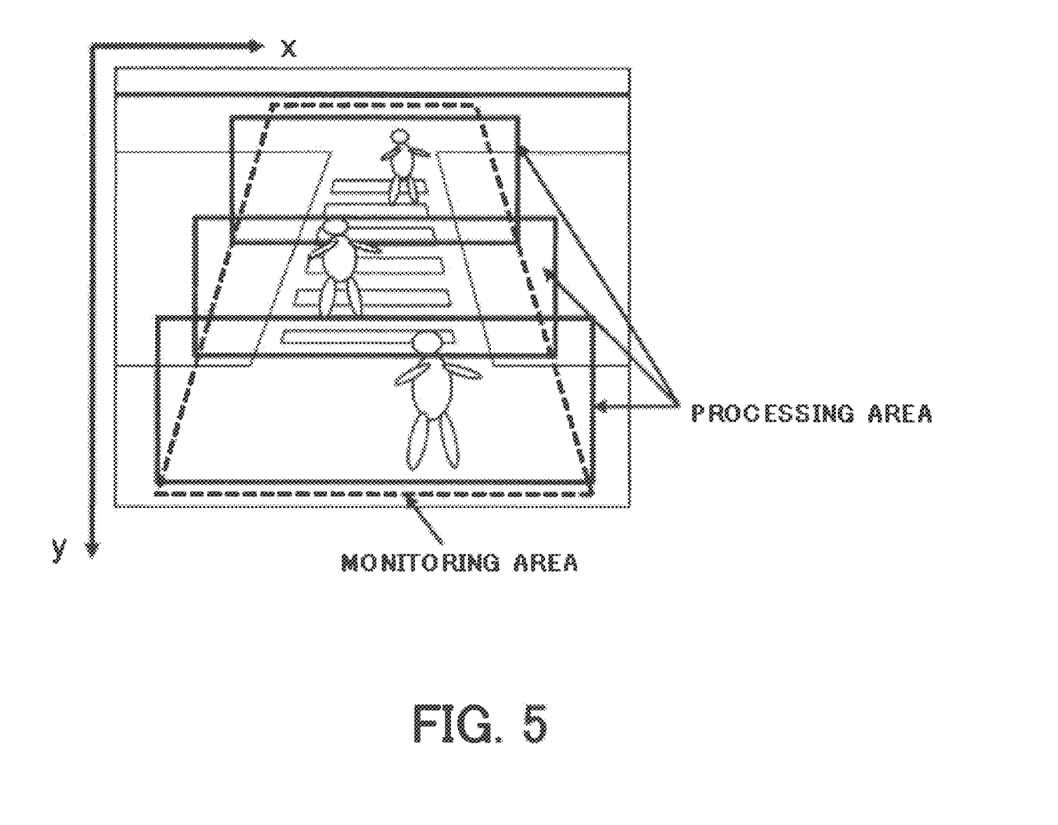
FIG. 5 shows a schematic of setting processing of the processing area of one embodiment of the invention.

The number of a processing area may be reduced according to the performance of a computer. According to this embodiment, intervals are provided based on disparity d for a y direction to set three processing areas. FIG. 5 shows an example of setting three processing areas. The intervals may be constant.

Figure 6:
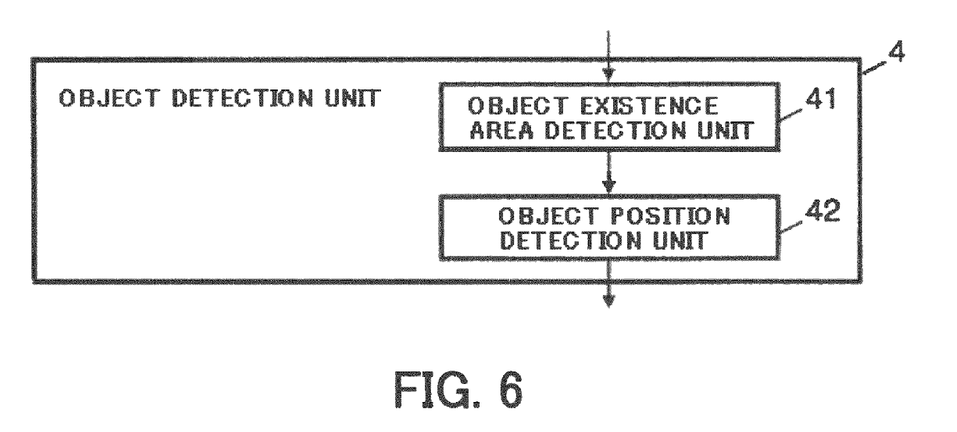
FIG. 6 is a block diagram of the object detection unit of one embodiment of the invention.

FIG. 6 is a block diagram of the object detection unit 4. The object detection unit 4 has an object existence area detection unit 41 and an object position detection unit 42.

Figure 7:
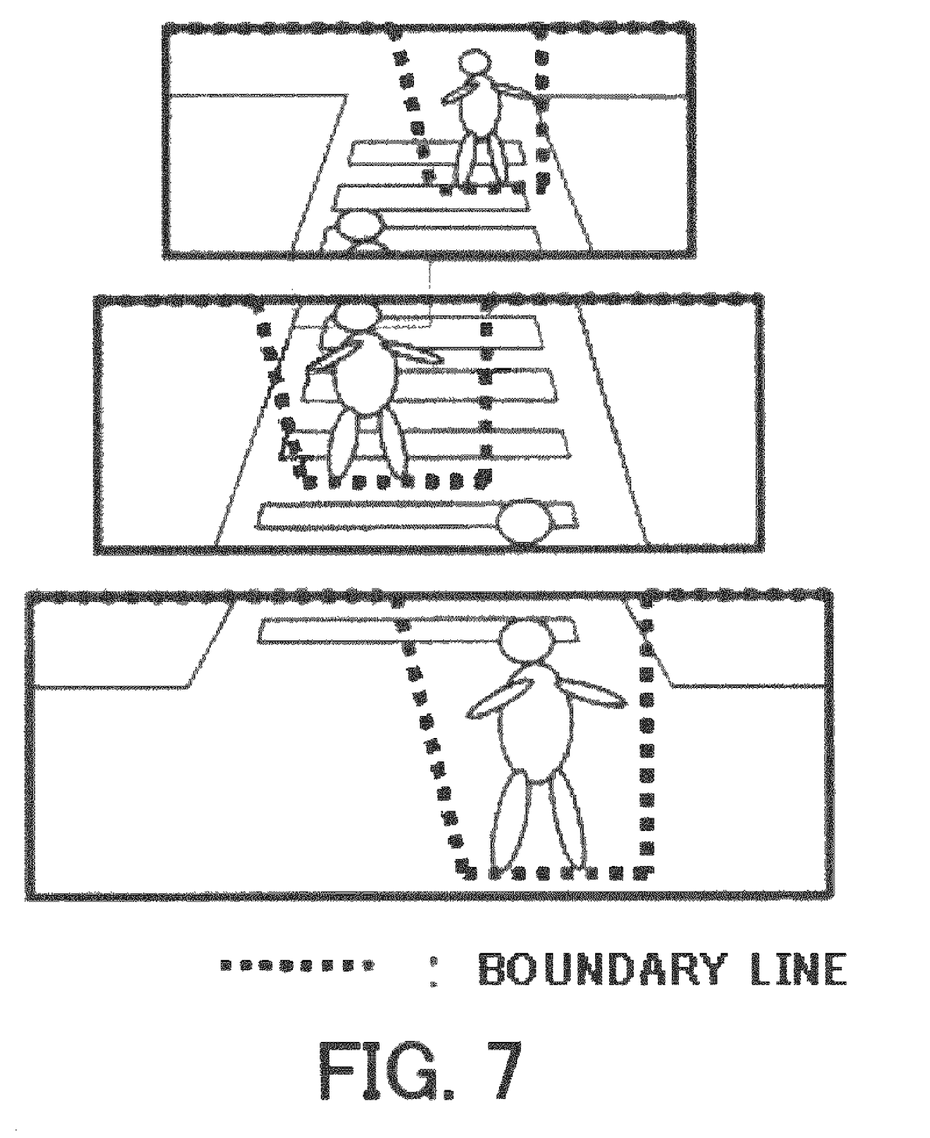
FIG. 7 shows a schematic of the processing for calculating the boundary line of one embodiment of the invention.

The object existence area detection unit 41 detects a boundary line between a plane of a monitoring area and objects for each processing area set by the processing area setting unit 3, as shown in FIG. 7. In this embodiment, the technique disclosed in JP-A 2006-53890 (KOKAI) may be used as the technique of detecting the boundary line. The techniques of distinguishing a plane from the other area have been proposed variously. Any types of techniques may be applied to the embodiments of the invention.

Figure 8:
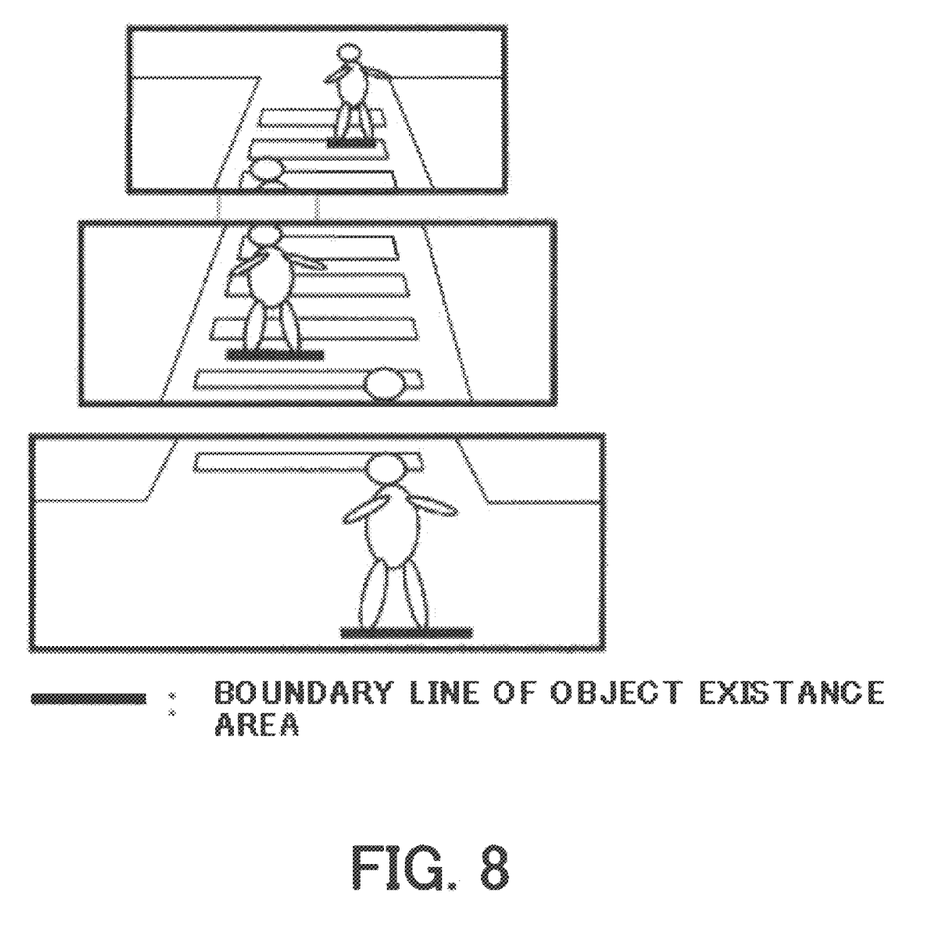
FIG. 8 shows a schematic of the processing for calculating the boundary line of one embodiment of the invention.

Next, an edge image is detected using a Sobel filter for a vertical direction. Vertical edge density is calculated in x direction for the area between the top position of a processing area and the boundary line. The area where vertical edge density is greater than a threshold is judged to be an object existence area. As shown in FIG. 8, the boundary layer position of the object existence area may be calculated.

Figure 9:
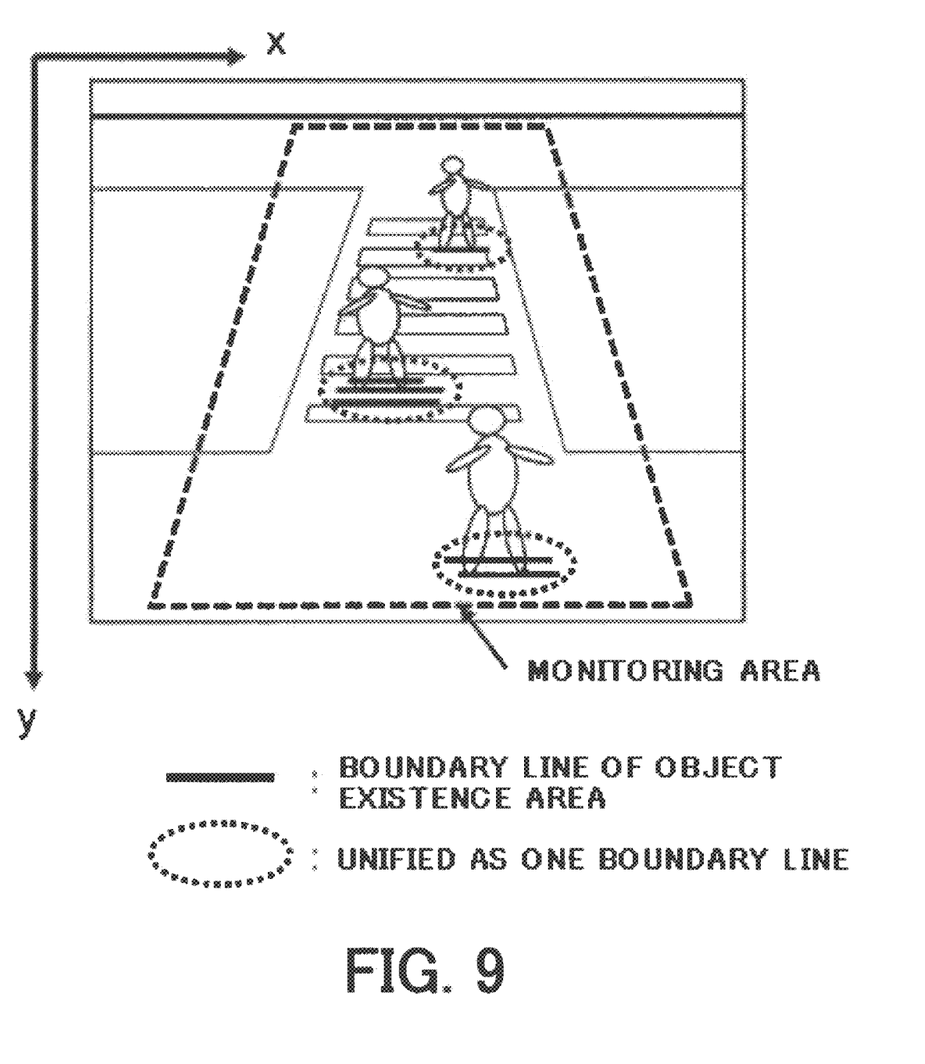
FIG. 9 shows schematic of a unifying processing of one embodiment of the invention.
Figure 10:
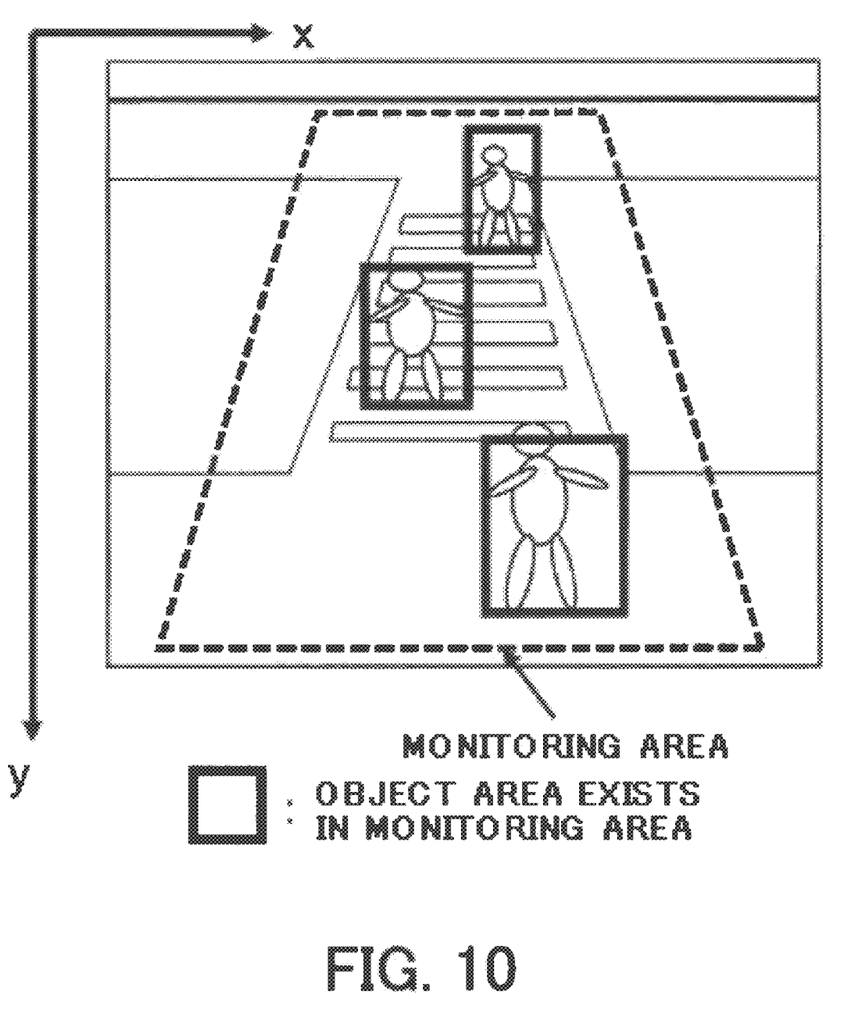
FIG. 10 shows schematic of an object area detection result of one embodiment of the invention.

The object position detection unit 42 unifies the boundary position of the object existence area, which may be calculated by a plurality of processing areas, as an object position which exists in the monitoring area. As shown in FIG. 9, the boundary line of an object existence area may be calculated for the same object in a plurality of processing areas. In this case, when the difference of disparity is within a threshold, the boundary lines are unified as one boundary line. The threshold is determined based on disparity. The boundary lines are segmented into separated components. As shown in FIG. 10, the height h in an image corresponding to the reference value H at the position of the boundary line is calculated for each of the separated component, and the size of the object area is determined.

Figure 11:
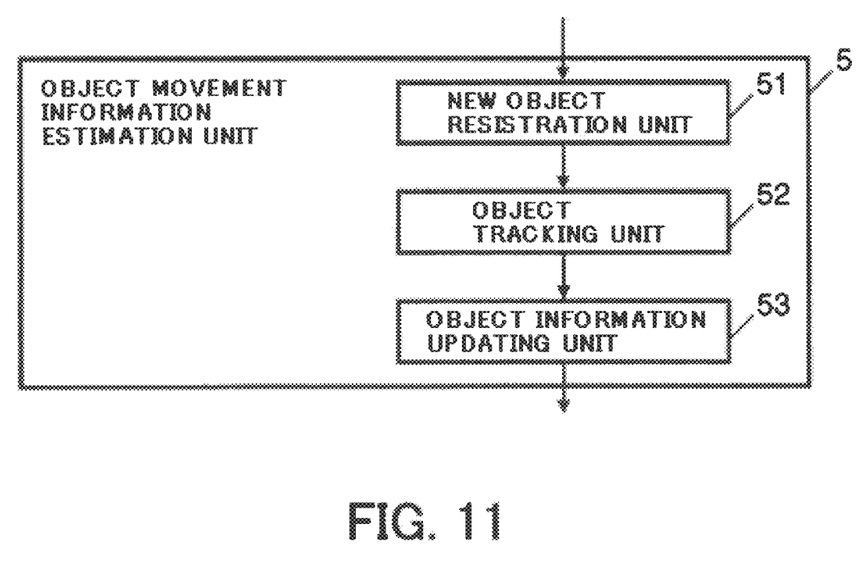
FIG. 11 shows a block diagram of the object movement information estimation unit of one embodiment of the invention.

As shown in FIG. 11, the object movement information estimation unit 5 may comprise a new object registration unit 51, an object tracking unit 52, and an object information updating unit 53. The object movement information estimation unit 5 tracks the objects detected by the object detection unit 4 in a time series. The new object registration unit 51 registers the position in the world coordinate system (coordinate system of three-dimensional real space) of the detected objects, and the position on an image. The texture information of the object area on an image is also registered as a template.

The object tracking unit 52 calculates the position of the registered object area in the next time step by template matching. In the template matching, an evaluation value using an absolute value difference (SAD: Sum of Absolute Difference) of a luminance value as shown in equation 4 is used. An object image is set to I (m, n), template to T (m, n), and size of the template to M×N.

$$SAD = \sum_{j=n}^{N} \sum_{i=m}^{M} |\{I(i,j) - \bar{I}\} - \{T(i,j) - \bar{T}\}| \quad (4)$$

$$\bar{I} = \sum_{j=n}^{N} \sum_{i=m}^{M} I(i,j)/MN$$

$$\bar{T} = \sum_{j=n}^{N} \sum_{i=m}^{M} T(i,j)/MN$$

Since various evaluation values may be used in the template matching, other evaluation values may be used.

The object information updating unit 53 calculates a distance difference of the object tracked by object tracking unit 52, and the object detected by the object detection unit 4. The object information updating unit 53 judges the objects as the corresponding objects, when the distance difference is smaller than a threshold. In the case of the corresponding objects, an average value of the object position by a tracking result and the object position by a detection result is calculated, and the averaged position is updated as positions of the objects. The texture information of the object area by the averaged position is also updated. Weighting may be calculated when calculating average value.

The new object registration unit 51 registers objects in a detection result, which do not correspond to any of the tracked objects, as a new object. As for the updated object, the position and speed of the objects are estimated using a Kalman filter with a constant acceleration motion model may be applied. Other filter which estimates position and speed may also be used.

The above processings are processed for time series images to detect the position and speed of an object, such as pedestrians and bicycles.

What is claimed is:

1. An object detection apparatus, comprising:
   an image capturing unit configured to capture time series images of a target monitoring area using stereo cameras,
   a disparity profile calculation unit configured to calculate a disparity profile indicating a relation between a vertical position on the time series images and a disparity on a plane of the target monitoring area, based on an arrangement of the stereo cameras,
   a processing area setting unit configured to set a plurality of processing areas, by setting a position of the bottom of each of the plurality of processing areas on the time series images and setting a height of each of the processing areas using a length obtained by converting a reference value of a height of an object at the bottom of the processing area according to the disparity profile,
   an object detection unit configured to detect an object having a height higher than a certain height with respect to a plane of the monitoring area from each of the processing areas, unify an object detection result in each of the processing areas according to the disparity of the object, and detect the object of the whole monitoring area,
   an object movement information estimation unit configured to estimate position and speed for the object detected by the object detection unit.

2. The apparatus according to claim 1, wherein the object detection unit includes:
   an object existence area detection unit configured to detect a boundary line between a plane of the monitoring area and the object from the time series images for each of the processing areas and set an area with edge density greater than a certain density between the top of each of the processing areas and the boundary line to be an object existence area of each of the processing areas,
   an object position detection unit configured to unify an object existence area of each of the processing areas according to disparity, and detect the unified area as an object when areas, which have substantially the same coordinate value in a vertical direction of an image, have a width greater than a certain width in a horizontal direction of an image on the boundary of the object existence area unified with the plane of the monitoring area.

3. The apparatus according to claim 1, wherein the object movement information estimation unit includes:
   a new object registration unit configured to register position and texture information newly for an area of an object obtained from the object detection unit,
   an object tracking unit configured to track a registered object based on the texture information,
   an object information updating unit configured to calculate an object position averaged by a certain weight of a tracked object position and an object position obtained from the object detection unit, and update an object position and texture information.

4. The apparatus according to claim 1, wherein the processing area setting unit sets the plurality of processing areas in a perpendicular direction on the time series images at a predetermined interval and extends a height of the processing areas in upper and lower directions according to disparity of an object.

5. A computer implemented method for causing a computer to detect an object, comprising:
   capturing time series images of a target monitoring area using stereo cameras,
   calculating a disparity profile indicating a relation between a perpendicular position on the time series images and a disparity on a plane of the target monitoring area, based on an arrangement of the stereo cameras,
   setting a plurality of processing areas, by setting a position of the bottom of each of the plurality of processing areas on the time series images and setting a height of each of the processing areas using a length obtained by converting a reference value of a height of an object at the bottom of the processing area according to the disparity profile,
   detecting an object having a height higher than a certain height with respect to a plane of the monitoring area from each of the processing areas, unifying an object detection result in each of the processing areas according to the disparity of the object, and detecting the object of the whole monitoring area,
   estimating position and speed for the object detected in the detecting step.

* * * * *